United States Patent
Mizuno et al.

(10) Patent No.: US 10,075,561 B2
(45) Date of Patent: Sep. 11, 2018

(54) SERVER, CLIENT APPARATUS, ARBITRATION METHOD, SERVICE REQUESTING METHOD, AND DATA DISTRIBUTION SYSTEM

(71) Applicant: SONY COMPUTER ENTERTAINMENT INC., Tokyo (JP)

(72) Inventors: Masayoshi Mizuno, Tokyo (JP); Manabu Nishizawa, Tokyo (JP); Yuki Kobayashi, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 267 days.

(21) Appl. No.: 14/387,956

(22) PCT Filed: Apr. 8, 2013

(86) PCT No.: PCT/JP2013/002403
§ 371 (c)(1),
(2) Date: Sep. 25, 2014

(87) PCT Pub. No.: WO2013/157221
PCT Pub. Date: Oct. 24, 2013

(65) Prior Publication Data
US 2015/0052191 A1  Feb. 19, 2015

(30) Foreign Application Priority Data
Apr. 16, 2012  (JP) .................. 2012-093334

(51) Int. Cl.
*H04L 29/06* (2006.01)
*H04L 29/08* (2006.01)
(Continued)

(52) U.S. Cl.
CPC ............ *H04L 67/42* (2013.01); *H04L 65/103* (2013.01); *H04L 65/4076* (2013.01);
(Continued)

(58) Field of Classification Search
CPC ............ H04N 5/775; H04N 21/43615; H04N 21/4333; H04N 21/4126; H04L 67/125;
(Continued)

(56) References Cited

U.S. PATENT DOCUMENTS

2005/0050252 A1* 3/2005 Kuno .................. H04N 5/44504
710/100
2006/0230120 A1* 10/2006 Yasuda ............. H04L 29/06027
709/217
(Continued)

FOREIGN PATENT DOCUMENTS

EP         2328092 A2    6/2011
JP      2005-086689 A    3/2005

OTHER PUBLICATIONS

Translation of International Preliminary Report on Patentability dated May 14, 2013 from corresponding Application No. PCT/JP2013/002403.
(Continued)

*Primary Examiner* — Shean Tokuta
*Assistant Examiner* — Juan C Turriate Gastulo
(74) *Attorney, Agent, or Firm* — Katten Muchin Rosenman LLP (57) ABSTRACT

A connection section 112 is connected to a client apparatus through a network. A service providing unit provides a service of reception/distribution of a digital broadcast in accordance with a service providing request supplied from the client apparatus. A client information storage section 116 stores therein information associated with the client apparatus connected to the connection section 112. When the service providing request is supplied from a second client apparatus while the service providing unit provides an exclusive service to a first client apparatus, a client information presentation section 110 presents information associated with at least one client apparatus to the other client
(Continued)

apparatus. An arbitration section 114 causes at least one of the first client apparatus and the second client apparatus to select whether or not to stop the service for the first client apparatus and to start the provision of the service to the second client apparatus.

11 Claims, 9 Drawing Sheets

(51) Int. Cl.
  *H04N 21/41* (2011.01)
  *H04N 21/433* (2011.01)
  *H04N 21/436* (2011.01)
  *H04N 5/775* (2006.01)

(52) U.S. Cl.
  CPC ............ *H04L 67/10* (2013.01); *H04L 67/125* (2013.01); *H04L 67/142* (2013.01); *H04L 67/36* (2013.01); *H04N 5/775* (2013.01); *H04N 21/4126* (2013.01); *H04N 21/4333* (2013.01); *H04N 21/43615* (2013.01)

(58) Field of Classification Search
  CPC ....... H04L 67/36; H04L 65/103; H04L 67/42; H04L 65/4076; H04L 67/142; H04L 67/10
  See application file for complete search history.

(56) References Cited

U.S. PATENT DOCUMENTS

| | | | | |
|---|---|---|---|---|
| 2006/0262221 | A1* | 11/2006 | Yuasa | H04N 21/4104 348/553 |
| 2007/0171198 | A1* | 7/2007 | Yokozawa | G06F 3/1423 345/156 |
| 2008/0034099 | A1* | 2/2008 | Kageyama | H04L 29/12367 709/228 |
| 2010/0174801 | A1* | 7/2010 | Tabaaloute | H04L 12/2812 709/217 |
| 2011/0131599 | A1* | 6/2011 | Lee | G06F 13/385 725/25 |
| 2011/0164180 | A1* | 7/2011 | Lee | G06F 3/1423 348/521 |

OTHER PUBLICATIONS

International Search Report dated May 14, 2013, from the corresponding PCT/JP2013/002403.
Notification of Reasons for Refusal dated May 7, 2013, from the corresponding Japanese Application No. JP 2012-093334.
Asakura, Fujiwara, Special Taidan kono Aki no Shinseihin o Kiru!!, HiVi, Oct. 20, 2008 (Oct. 20, 2008), vol. 26, No. 10, pp. 128 to 133, ISSN: 1345-6113, particularly, p. 133, col. 2, lines 17 to 20.
The extended European search report dated Nov. 2, 2015, from the corresponding European Application No. 13778921.0.
European Communication pursuant to Article 94(3) EPC dated Apr. 10, 2018, from the corresponding European Application No. 13778921.0.

* cited by examiner

| RESPONSE | | | | | |
|---|---|---|---|---|---|
| Content-Type | application/json | | | | 116 |
| PARAMETER | | | TYPE | VALUE | EXPLANATION |
| number | | | NUMERICAL VALUE | 0~2 | THE NUMBER OF CLIENTS CONTAINED IN RESPONSE |
| client | | | JSON Array | | LIST OF CLIENTS |
| | id | | NUMERICAL VALUE | 0~4294967295 (0x0~0xFFFFFFFF) | IDs OF CLIENTS |
| | macAddr | | CHARACTER STRING | XX:XX:XX:XX:XX:XX | MAC ADDRESS |
| | ipAddr | | CHARACTER STRING | XXX.XXX.XXX.XXX | IP ADDRESS |
| | name | | CHARACTER STRING | UP TO 31 BYTES (UP TO 62 BYTES) ※ CASE WHERE ALL CHARACTERS ARE 0x22, 0x5c, 0x2f IS GIVEN IN PARENTHESIS | CLIENT NAME |
| | purpose | | NUMERICAL VALUE | 1 = LIVE-VIEWING 2 = REPRODUCTION OF RECORDED CONTENTS 3 = Move OF RECORDED CONTENTS | CONNECTION PURPOSE |
| | liveinfo | | JSON OBJECT | | LIVE-VIEWING INFORMATION |
| | | broadoastingType | NUMERICAL VALUE | 2 = DIGITAL TERRESTRIAL BROADCAST 3 = BS 4 = CS | KIND OF BROADCAST UNDER LIVE-VIEWING |
| | | serviceid | NUMERICAL VALUE | 0~65635 (0x0~0xFFFF) | SERVICE ID UNDER LIVE-VIEWING |
| | content | | JSON OBJECT | | INFORMATION UNDER RECORDED CONTENTS REPRODUCTION/ Move |
| | | id | CHARACTER STRING | 20 CHARACTERS IN HALF WIDTH | RECORDED CONTENTS ID |

SERVER, CLIENT APPARATUS, ARBITRATION METHOD, SERVICE REQUESTING METHOD, AND DATA DISTRIBUTION SYSTEM

TECHNICAL FIELD

The present invention relates to an arbitration technology for a server, a client apparatus, and a data distribution system including the server and the client apparatus.

BACKGROUND ART

In recent years, it has become popular to construct a storage system, wherein a NAS (Network Attached Storage) is connected to a computer network, in the home. The NAS is a file server which includes a hard disk drive and provides a content file to a client apparatus through a TCP/IP network.

Among such NASs, some NAS includes a tuner compatible with both of terrestrial digital broadcast and satellite digital broadcast, and a user can live-view a program on the client apparatus through the TCP/IP network and view a recorded program.

SUMMARY

Technical Problem

When a user live-views a program streaming-distributed through a TCP/IP network, transmission or reproduction is executed after a given amount of data is buffered, for example, in order to absorb a variation of the bit rate of streaming data. Therefore, time is required after the user issues a request for viewing of a program from a client apparatus to a server until reproduction is actually started.

Also when the user changes over the channel for a program during live-viewing of a program streaming-distributed through the TCP/IP network, time is required until a program after the changeover is reproduced. This may cause the user to feel bothered.

The present invention has been made in view of such a problem as described above, and it is an object of the present invention to provide a technology for reducing the time required after a request for data distribution until reproduction is started in a server-client system.

Solution to Problem

In order to solve the problem described above, a server according to a certain mode of the present invention includes: a connection section configured to be connectable to one or more client apparatuses through a network; a service providing unit configured to provide at least one service from among services of live-reception of a digital broadcast, distribution of recorded data, and movement of the recorded data to a different apparatus in accordance with a service providing request supplied from the client apparatus which is being connected to the connection section; a client information storage section configured to store therein information associated with the client apparatus while the connection section is connected to the client apparatus; a client information presentation section configured to carry out at least one of that information associated with a first client apparatus and stored in the client information storage section is presented to a second client apparatus, and that information associated with the second client apparatus is presented to the first client apparatus, when a service providing request is supplied from the second client apparatus while a service which is not permitted to be simultaneously provided for a plurality of client apparatuses is provided to the first client apparatus by the service providing unit; and an arbitration section configured to cause the service providing unit to stop the service which is being provided to the first client apparatus, and causing at least one of the first client apparatus and the second client apparatus to select whether or not the provision of the service which the second client requests to provide is started.

Another mode of the present invention is an arbitration method. The arbitration method causing a processor to execute: a step of providing at least one service from among services of live-reception of a digital broadcast, distribution of recorded data, and movement of the recorded data to a different apparatus in accordance with a service providing request from a client apparatus; a step of storing information associated with the client apparatus while connection to the client apparatus is made; a step of carrying out at least one of that information associated with a first client apparatus is presented to a second client apparatus, and that information associated with the second client apparatus is presented to the first client apparatus, when a service providing request is supplied from the second client apparatus while a service which is not permitted to be simultaneously provided for a plurality of client apparatuses is provided to the first client apparatus; and a step of stopping a service which is being provided to the first client apparatus, and causing at least one of the first client apparatus and the second client apparatus to select whether or not the provision of the service which the second client requests to provide is started.

A still another mode of the present invention is a client apparatus. This apparatus includes: a service requesting section configured to request a server to provide a service, the server providing at least one service from among services of live-reception of a digital broadcast, distribution of recorded data, and movement of the recorded data to a different apparatus through a network; a client information acquisition section configured to acquire, from the server, information associated with a different client apparatus which is receiving provision of a service from the server when the service requesting section requests the server to provide a service; a presentation section configured to present the information associated with the different client apparatus acquired by the client information acquisition section; a selection acquisition section configured to cause the server to stop the service which is being provided to the different client apparatus and configured to acquire selection by a user as to whether or not provision of the service which the service requesting section requests to provide is intended to be started; and a selection informing section configured to inform the server of the selection acquired by the selection acquisition section.

A yet another mode of the present invention is a service request method. In accordance with this method, a processor is caused to execute: a step of requesting a server to provide a service, the server providing at least one service from among services of live-reception of a digital broadcast, distribution of recorded data, and movement of the recorded data to a different client apparatus through a network; a step of acquiring, from the server, information associated with a different client apparatus which is receiving provision of a service from the server when the server is requested to make a service; a step of presenting the acquired information associated with the different client apparatus; a step of causing the server to stop the service which is being provided to the different client apparatus, and acquiring selection by a user as to whether or not provision of the service requested is intended to be started; and a step of informing the server of the acquired selection.

A further mode of the present invention is a data distribution system. This system includes: the server described above; the client apparatus described above; and a network through which data communication can be made between the server and the client apparatus. Here, the client apparatus requests the server to provide a service through the network, and requests the server to provide information associated with a client apparatus, different from the client apparatus, which is being provided with a service when the server is providing an exclusive service to the different client apparatus. The server stops the service which is being provided to the different client apparatus in accordance with a request supplied from the client apparatus which acquires the information associated with the different client apparatus, and starts provision of the service which the client apparatus requests.

A yet further mode of the present invention is a program for causing a computer to implement the steps of any of the above methods.

The program may be provided as part of firmware incorporated in an apparatus in order to perform basic control of hardware resources such as a video or audio decoder. The firmware is stored in a semiconductor memory such as, for example, a ROM (Read Only Memory) or a flash memory in the apparatus. In order to provide the firmware, or in order to update part of the firm ware, a computer-readable recording medium on which the program is recorded may be provided, or the program may be transmitted by a communication line.

It is to be noted that arbitrary combinations of the components described hereinabove and the representations of the present invention which are transformed between a method, an apparatus, a system, a computer program, a data structure, a recording medium and so forth are effective as modes of the present invention.

Advantageous Effect of Invention

According to the present invention, the time required after a request for data distribution is issued until reproduction is started can be reduced in a server-client system.

DESCRIPTION OF EMBODIMENT

Figure 1:
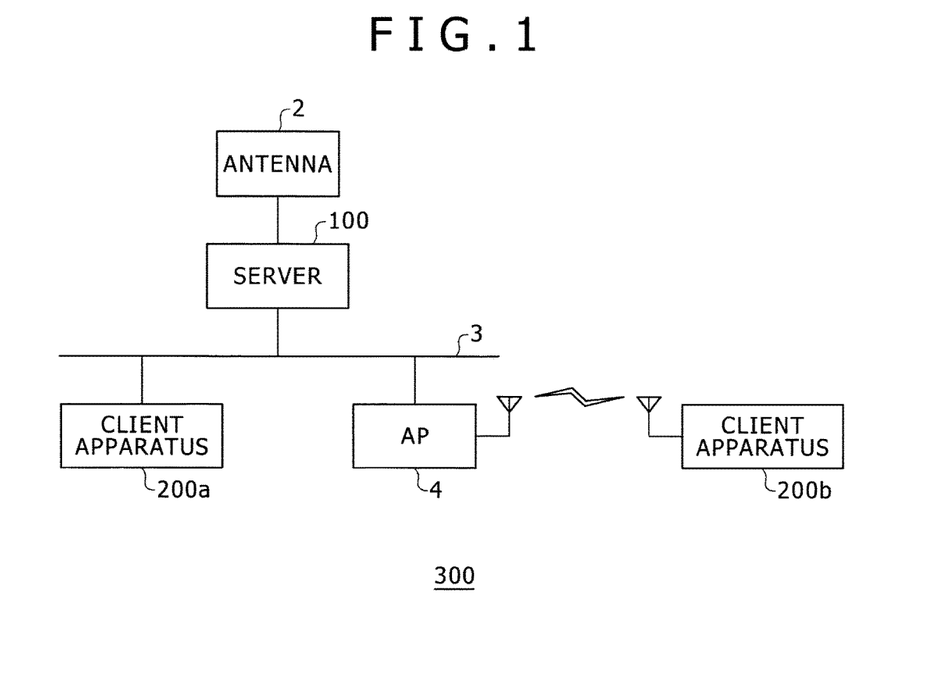
FIG. 1 is a view schematically depicting a general configuration of a data distribution system according to an embodiment.

FIG. 1 is a view schematically depicting a general configuration of a data distribution system 300 according to an embodiment. The data distribution system according to the embodiment includes an antenna 2, a server 100, a plurality of client apparatus collectively referred to as client apparatus 200, an access point (Access Point; AP) 4, and a network 3 which is a transmission path of data.

The antenna 2 receives digital broadcasts such as terrestrial digital broadcasts and satellite digital broadcasts. The server 100 includes a three-wave tuner for a terrestrial digital broadcast, a BS digital broadcast and a CS digital broadcast, and live-distributes a program to the client apparatus 200 through the network 3 serving as a transmission path. The server 100 includes also a storage and functions also as a NAS which provides a recorded program to the client apparatus 200. It is to be noted that, in the present specification, live distribution wherein a digital broadcast received by the antenna 2 is distributed to a client apparatus immediately or to record a digital broadcast received by the antenna 2 into the storage is sometimes referred to as "live reception." Details of a configuration of the server 100 and the client apparatus 200 are hereinafter described.

Although two client apparatus 200 including client apparatus 200a and 200b are depicted in FIG. 1, the number of client apparatus 200 which can communicate with the server 100 is not limited to two but may be greater or smaller than two. The client apparatus 200 are compatible with the DLNA (Digital Living Network Alliance) and can access the server 100 to acquire a recorded program and reproduce the program. It is to be noted that the client apparatus 200b in FIG. 1 is, for example, a portable information terminal and can communicate with the server 100 by wireless communication through the access point 4.

By the way, when the server 100 includes only one tuner, the server 100 cannot live-receive a plurality of digital broadcasts. For example, in FIG. 1, the server 100 cannot live-distributes a certain program in accordance with a request supplied from the client apparatus 200a and process a request to record another broadcast which has been received from the client apparatus 200b at the same time. Therefore, when the number of servers 100 included in the data distribution system 300 is larger than the number of client apparatuses 200, it is required to arbitrate the order of priorities of the services which the server 100 provides for the client apparatus 200. Hereinafter, a description will be given with respect to the arbitration of the order of priorities.

Figure 2:
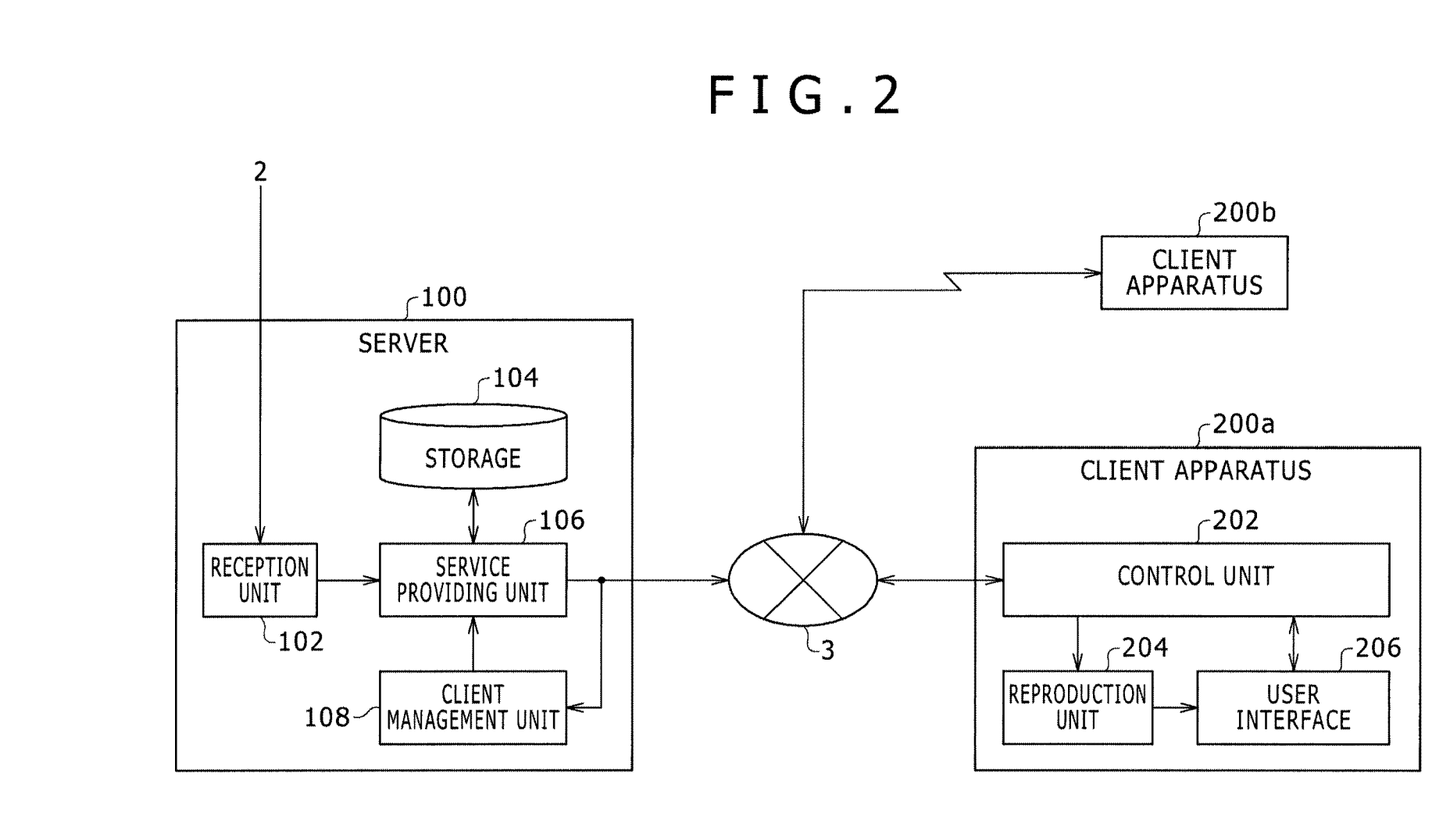
FIG. 2 is a view schematically depicting an internal configuration of a server and a client apparatus according to the embodiment.

FIG. 2 is a view schematically depicting an internal configuration of the server 100 and the client apparatus 200 according to the embodiment. The server 100 includes a reception unit 102, a storage 104, a service providing unit 106 and a client management unit 108. The client apparatus 200 are connected to the server 100 through the network 3. Each of the client apparatus 200 includes a control unit 202 which comprehensively controls operation of the client apparatus 200, a reproduction unit 204 which reproduces program data received from the server 100, and a user interface 206.

The reception unit 102 is a three-wave tuner described hereinabove and demodulates a digital broadcast wave to restore a signal wave. The client management unit 108 is connected to one or more client apparatus 200 through the network 3 and acquires a request for a service to be provided by the server 100 from a client apparatus 200 which is currently connected to the server 100. The service providing unit 106 provides, in response to a service providing request from a client apparatus 200 acquired by the client management unit 108, at least one service from among services of live distribution of a digital broadcast, distribution of recorded data and movement of the recorded data to a different apparatus. To this end, the service providing unit 106 produces program data from a signal demodulated by the reception unit 102 and records the program data into the storage 104 or distributes the program data to the client apparatus 200.

Figure 3:
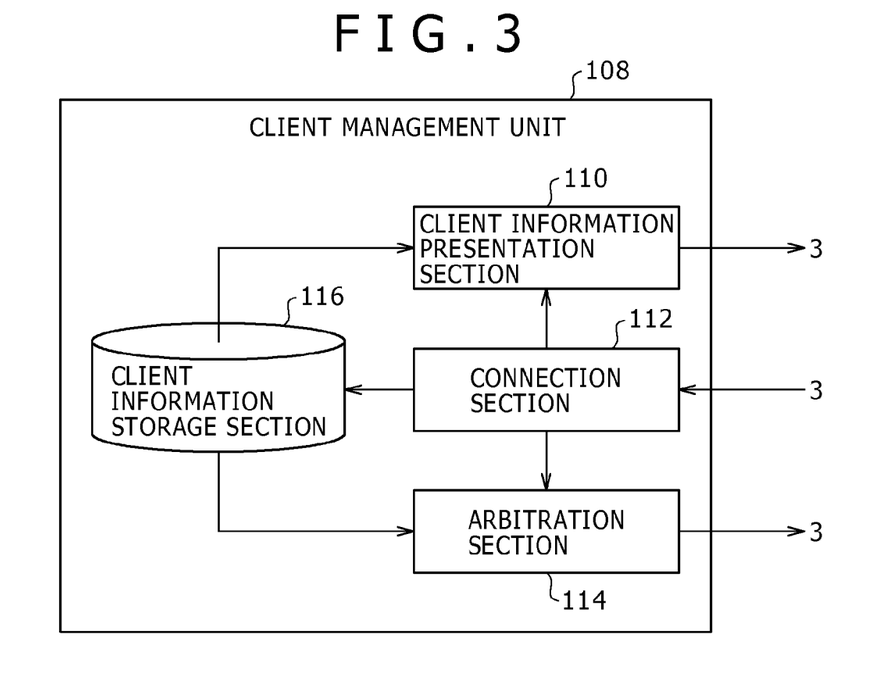
FIG. 3 is a view schematically depicting an internal configuration of a client management unit within the server according to the embodiment.

FIG. 3 is a view schematically depicting an internal configuration of a client management unit 108 within the server 100 according to the embodiment. The client management unit 108 according to the embodiment includes a client information presentation section 110, a connection section 112, an arbitration section 114, and a client information storage section 116.

The connection section 112 is connected to one or more client apparatuses 200 through the network 3. While the connection section 112 is connected to the client apparatus 200, the client information storage section 116 stores therein information associated with the client apparatus 200 concerned. Although details will be described later, "the information associated with the client apparatus 200" contains therein information based on which the client apparatus 200 can be uniquely identified.

As described above, the service is present which the service providing unit 106 does not permit to provide for a plurality of client apparatuses 200 at the same time. Specifically, when the service providing unit 106 is live-reception of the digital broadcast in accordance with the request supplied from the first client apparatus 200, the service providing unit 106 does not permit the second client apparatus 200 to provide any of other services. In addition, even when the service providing unit 106 is moving the program data in the storage 104 to a different client apparatus in accordance with the request supplied from the first client apparatus 200, likewise, the service providing unit 106 does not permit the second client apparatus 200 to provide any of other services.

Now, in the case where a request to provide the service is supplied from the second client apparatus 200 when the service providing unit 106 is providing to the first client apparatus 200 the service which is not permitted to be provided for a plurality of client apparatuses at the same time, the client information presentation section 110 presents the information, associated with the first client apparatus 200, which the client information storage section 116 stores therein to the second client apparatus 200. Here, the client information presentation section 110 presents the information associated with the first client apparatus 200 in accordance with an information presentation request supplied from the second client apparatus 200 to the second client apparatus 200. However, even when the information presentation request supplied from the second client apparatus 200 is not made, the information associated with the first client apparatus 200 may be presented to the second client apparatus 200.

Figure 4:
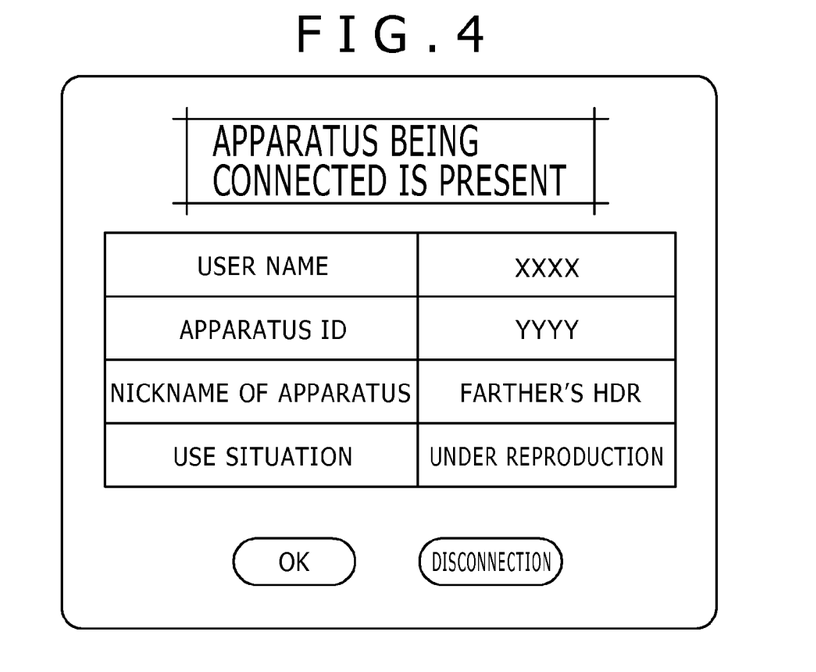
FIG. 4 is a view depicting an example of a picture presented by a client information presentation section within the server according to the embodiment.

FIG. 4 is a view depicting an example of a picture which the client information presentation section 110 within the server 100 according to the embodiment. An example of the picture shown in FIG. 4 is displayed on the user interface 206 of the client apparatus 200. The information associated with the first client apparatus 200 to which the service presentation unit 106 is providing the service is shown in the example shown in FIG. 4. Specifically, there are displayed a user name of a user who uses the first client apparatus 200, an apparatus ID (IDentification) for uniquely specifying the first client apparatus, a nickname added to the first client apparatus 200, and a use situation of the service providing unit 106, that is, a service which the service providing unit 106 is providing to the first client apparatus 200.

Figure 5:
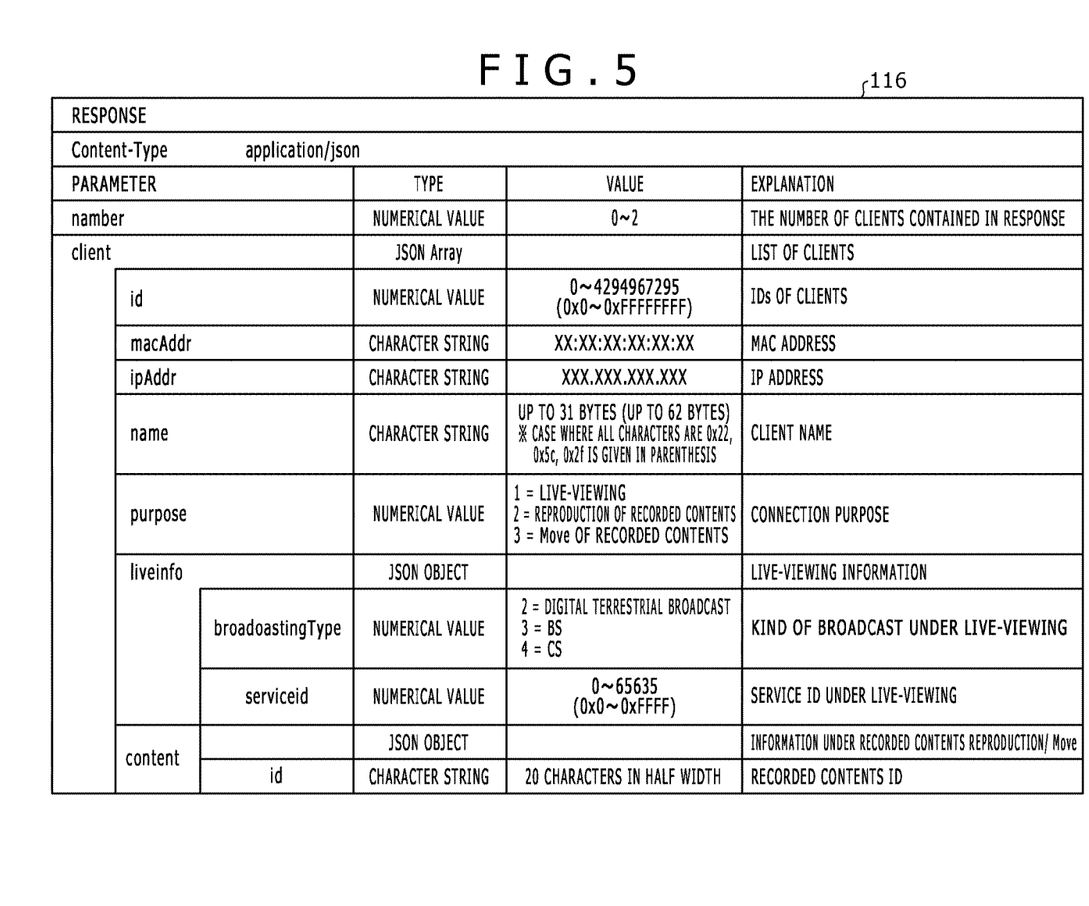
FIG. 5 is a diagram schematically depicting a structure of data stored in a client information storage section according to the embodiment.

For the purpose of realizing this, while the connection section 112 is connected to the client apparatus 200, the client information storage section 116 stores therein information associated with the client apparatus 200 concerned. FIG. 5 is a diagram schematically depicting an example of a structure of the data stored in the client information storage section 116 according to the embodiment stores therein. As shown in FIG. 5, the client information storage section 116 stores therein, for example, a MAC (Media Access Control) address of the client apparatus 200, an IP (Internet Protocol) address allocated to the client apparatus 200, and information on reproduction or a movement of the recorded contents in addition to the information presented by the client information presentation section 110. The information on the reproduction or movement of the recorded contents, for example, is a remaining time of the contents either under the reproduction or under the movement.

It is noted that an exchange of the information described above between the server 100 and the client apparatus 200 can be realized by using the known data description language such as JSON (JavaScript Object Natation).

The description will now be returned back to FIG. 3. The arbitration section 114 causes the service providing unit 106 to stop the service which is being provided to the first client apparatus 200, and causes a user of the second client apparatus 200 to select whether or not the provision of the service which the second client apparatus 200 requested is started. When a user of the first client apparatus 200 selects that the service being provided to the first client apparatus 200 is to be stopped, the user depresses a "disconnection" icon shown in FIG. 4. When the user has depressed the "disconnection" icon, the arbitration section 114 causes the service providing unit 106 to stop the service which is being provided to the first client apparatus 200, and causes the service providing unit 106 to start the provision of the service which the second client apparatus 200 requests to provide. When the user of the second client apparatus 200 does not desire to stop the service which is being provided to the first client apparatus 200, the user depresses an "OK" icon shown in FIG. 4. In this case, the arbitration section 114 does not execute particular processing, and thus the service providing unit 106 continues the provision of the service to the first client apparatus 200. In such a manner, the arbitration section 114 causes the service which is being provided to the first client apparatus 200 to be stopped in accordance with the request supplied from the second client apparatus 200, and causes the provision of the service which the second client apparatus 200 requests to provide to be started.

As a result, the user of the second client apparatus 200 connected to the server 100 can confirm whether or not the server 100 has already provided the service to a different client apparatus. When the server 100 has already provided the service to a different client apparatus, the second client apparatus 200 can confirm for whom what kind of service is provided. As may be necessary, the user of the second client apparatus 200 can also interrupt the service which the server 100 is providing to the different client apparatus 200, and can also start the provision of the service to the second client apparatus 200. For example, suppose the first client apparatus 200 is installed in a living room, and the second client apparatus 200 is installed in a bed room. When, for example, after the user has viewed a television program in the first client apparatus 200 in the living room, he/she moves to the bed room in which the second client apparatus 200 is installed without ending the first client apparatus 200, he/she can end the service which the first client apparatus 200 is receiving by remote control without returning back to the living room.

By the way, when the user of the second client apparatus 200 interrupts the service of the first client apparatus 200 while a certain user views a program by using the first client apparatus 200, since the live-distribution service is suddenly interrupted, it is also possible that the user who is viewing the program by using the first client apparatus 200 is embarrassed. Then, when the arbitration section 114 causes the service providing unit 106 to stop the service which is being provided to the first client apparatus 200, the client information presentation section 110 presents the information associated with the second client apparatus 200 to the first client apparatus 200.

Figure 6:
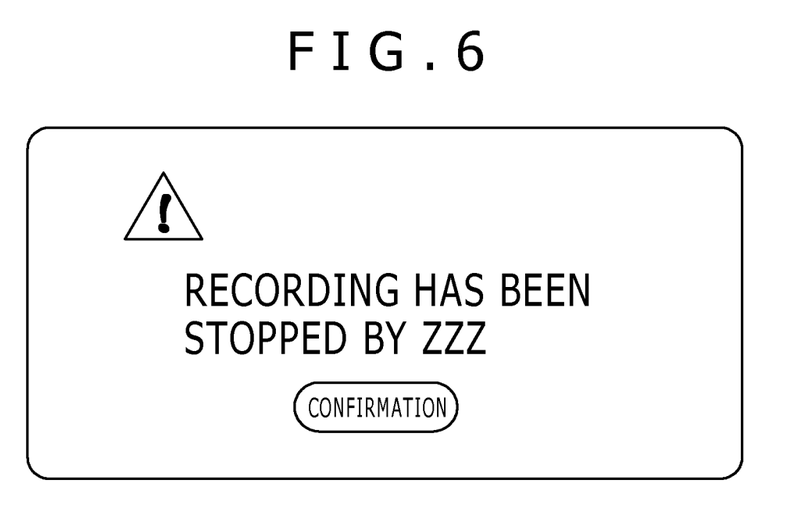
FIG. 6 is a view depicting another example of the picture presented by the client information presentation section within the server according to the embodiment.

FIG. 6 is a view depicting another example of a picture presented by the client information presentation section 110 within the server 100 according to the embodiment, and a view depicting an example of a picture which is presented to an apparatus for which the service is interrupted by a different apparatus. As shown in FIG. 6, information on a user who has indicated the interruption of the service is displayed on the user interface of the first client apparatus 200. As a result, the user of the first client apparatus 200 can know the cause by which the service is interrupted, and thus the embarrassment due to the service interruption is also reduced for him/her.

Figure 7:
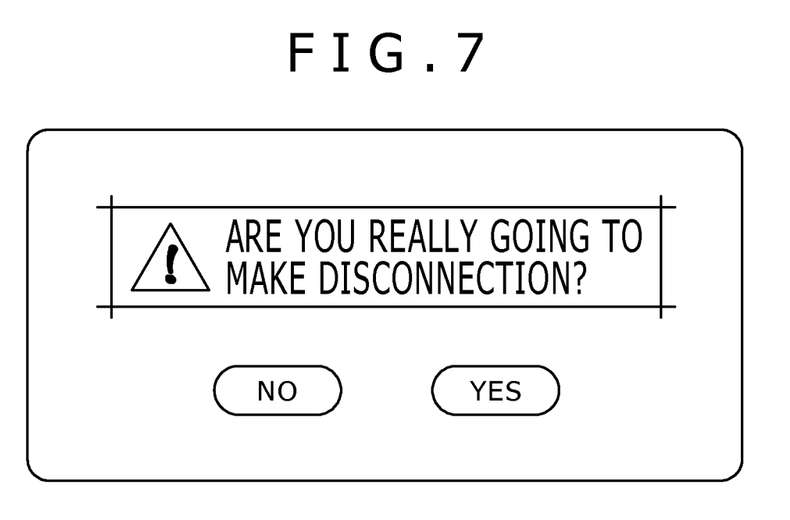
FIG. 7 is a view depicting still another example of the picture presented by the client information presentation section within the server according to the embodiment.

For the purpose of reducing that the service is stopped by a different apparatus through a manipulation mistake of the user, the client information presentation section 110 may also present notification for urging confirmation of intent to the client apparatus 200 which has indicated the stop of the service which is being provided to a different apparatus. FIG. 7 is a view depicting still another example of a picture presented by the client information presentation section 110 within the server 100 according to the embodiment, and is a view depicting an example of a picture for urging the confirmation of intent for the effect that the service which is being provided to a different apparatus is intended to be stopped. As shown in FIG. 7, it is repeatedly confirmed for the user of the second client apparatus 200 whether or not the service which is being provided to the first client apparatus 200 is intended to be stopped. Thereby, it becomes possible to reduce that the service was stopped by a different apparatus through the manipulation mistake.

Hereinabove, the description has been mainly given with respect to that the order of priorities of the services which the server 100 provides for the client apparatus 200 is arbitrated from a viewpoint of the server 100. Subsequently, a description will be given with respect to the arbitration of the order of priorities of the services from a viewpoint of the client apparatus 200.

Figure 8:
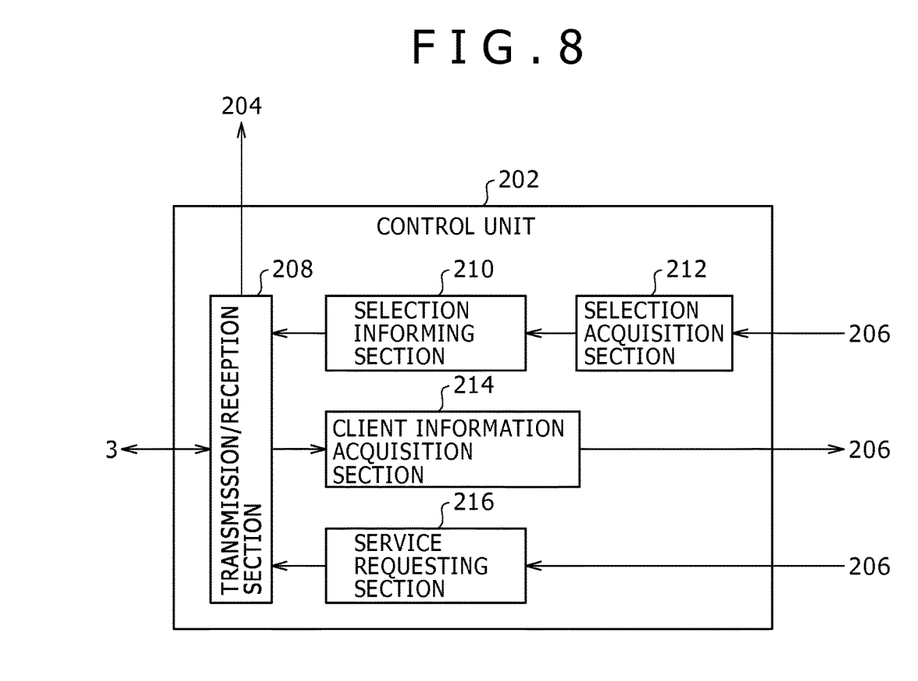
FIG. 8 is a view schematically depicting an internal configuration of a control unit within a client apparatus according to the embodiment.

FIG. 8 is a view schematically depicting an internal configuration of the control unit 202 within the client apparatus 200 according to the embodiment. The control unit 202 according to the embodiment includes a transmission/reception section 208, a selection informing section 210, a selection acquisition section 212, and a client information acquisition section 214.

The transmission/reception section 208 exchanges the information with the server 100 through the network 3. The transmission/reception section 208 can be realized by using the known communication module such as a Wi-Fi (registered trademark) module. The service requesting section 216 requests the server 100 through the transmission/reception section 208 to provide the service such as the live-reception of the digital broadcast or movement of the recorded data.

When the service requesting section 216 requests the server 100 to provide a service, the client information acquisition section 214 acquires the information associated with a different client apparatus 200 which has already received the provision of the service of the server 100 from the server 100 through the transmission/reception section 208. The user interface 206 functions as a presentation unit for presenting the information, associated with the different client apparatus 200, which has been acquired by the client information acquisition section 214. When the client apparatus 200, for example, is a stationary PVR, the user interface 206 is realized by a liquid crystal panel (not shown) accompanying the client apparatus 200, or a display portion of a television set connected to the client apparatus 200. In addition, if the client apparatus 200, for example, is a portable information terminal, then, the user interface 206 is realized by a display portion such as a touch panel.

The selection acquisition section 212 causes the server 100 to stop the service which is being provided to the different client apparatus 200, and acquires the selection by a user as to whether or not the provision of the service which the service requesting section 216 requests to provide is intended to be started. The selection informing section 210 informs the server 100 of the selection which the selection acquisition section 212 has acquired through the transmission/reception section 208.

Figure 9:
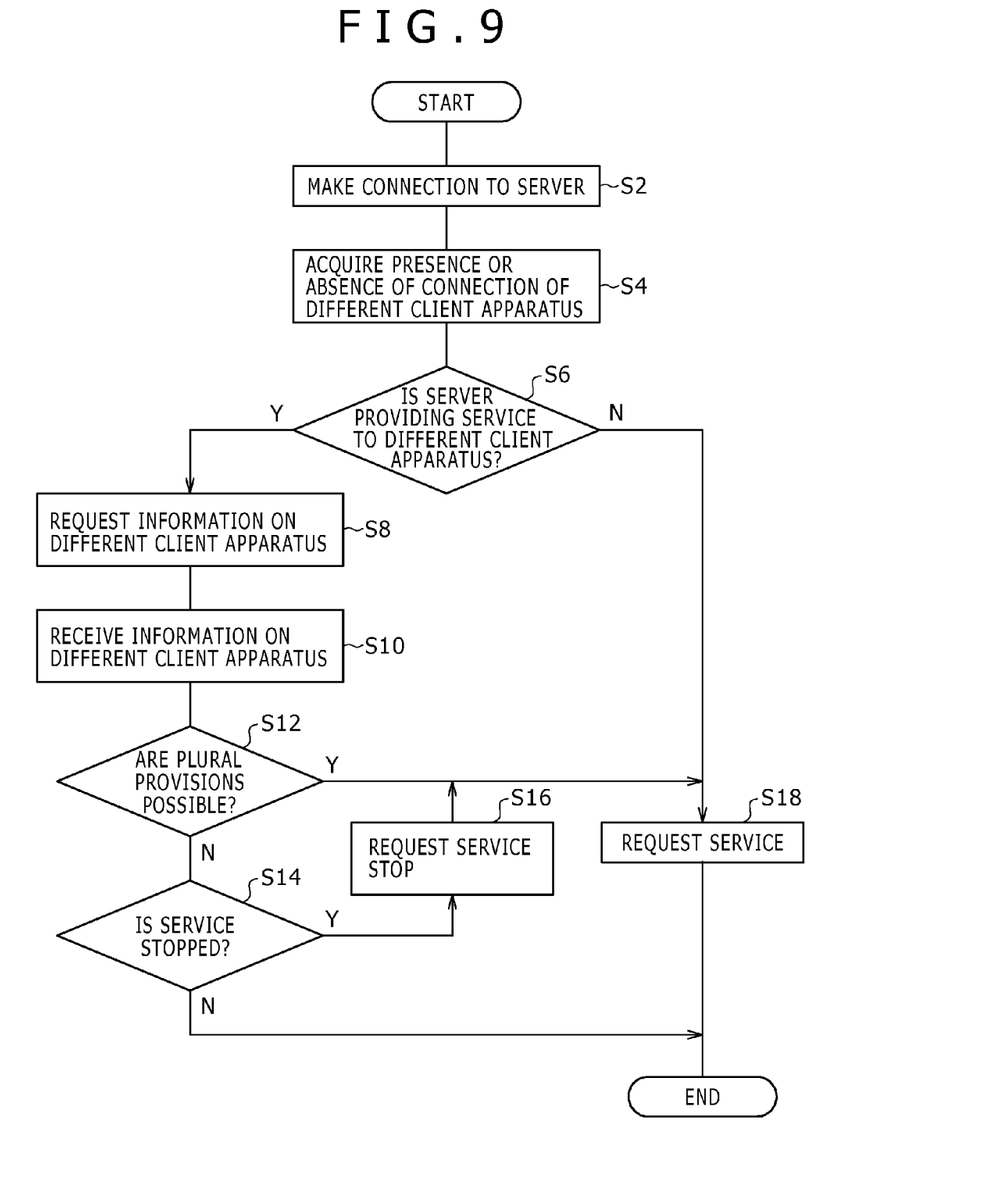
FIG. 9 is a flow chart illustrating a flow of arbitration processing for connection between the server and a plurality of client apparatus according to the embodiment.

FIG. 9 is a flow chart illustrating a flow of arbitration processing for connection between the server 100 according to the embodiment, and a plurality of client apparatuses 200, and is a chart mainly illustrating a flow of processing in the client apparatus 200 which requests the server 100 to start the service.

One client apparatus 200 of the plurality of client apparatuses 200 is connected to the server 100 (S2). The client apparatus 200 connected to the server 100 acquires information as to whether or not a different client apparatus 200 has already been connected to the server 100 from the server 100 (S4).

If the server 100 has already been providing a service to the different client apparatus 200 (Y in S6), the client apparatus 200 connected to the server 100 requests the server 100 to send thereto information associated with the different client apparatus 200 which is receiving the provision of the service (S8) to thereby acquire the information associated with the different client apparatus 200 concerned (S10).

When the service which the server 100 is providing to the different client apparatus 200 is exclusive, and thus the service is not permitted to be simultaneously provided for a plurality of client apparatuses 200 (N in S12), the client apparatus 200 connected to the server 100 selects that whether or not the server 100 is caused to stop the service which is being provided to another client apparatus 200 and newly start the provision of the service to the client apparatus 200 itself.

When it is selected that the server 100 is caused to stop the service which is being provided to the different client apparatus 200 (Y in S24), the client apparatus 200 connected to the server 100 requests the server 100 to stop the service which is being provided to the different client apparatus 200 (S16).

If the server 100 has not been providing a service to a different client apparatus 200 (N in S6), if the server 100 is permitted to simultaneously provide the service for a plurality of client apparatuses 200 (Y in S12), or after the client apparatus 200 connected to the server 100 has requested the server 100 to stop the service which has being provided to the different apparatus 200, the client apparatus 200 connected to the server 100 requests the server 100 to start the service (S18).

When the client apparatus 200 connected to the server 100 does not select either that the server 100 is requested to start the service, or that the server 100 is caused to stop the service which is being provided to the different client apparatus 200 (N in S24), the processing in this flow chart is ended.

The arbitration operation of the data distribution system 300 having the configuration described above is as follows.

The client apparatus 200 requests the server 100 to provide thereto the service to be provided through the network 3. In the case where the server 100 is providing the exclusive service to a different client apparatus 200 when the server has acquired the request to provide service from the client apparatus 200, the client apparatus 200 has requested the server 100 to send thereto the information associated with the different client apparatus 200 which is being provided with the service. In accordance with the request supplied from the client apparatus which requests the service, the server 100 stops the service of the different client apparatus 200 which is being provided with the service, and starts to provide the service to the client apparatus 200 which has requested the service requests.

As has been described so far, according to the data distribution system 300 of the embodiment, it becomes possible to arbitrate the competition for the right of use of the server 100 among a plurality of client apparatuses 200. Since the service which is antecedently being provided can be stopped as may be necessary, the time required until the reproduction is started after the data distribution was requested can be shortened.

As has been described so far, according to the data distribution system 300 according to the embodiment, the time required until the reproduction is started after the data distribution was requested can be shortened in the server client system.

Hereinabove, the present invention has been described based on the embodiment. The embodiment is an exemplification, and thus it is understood by those skilled in art that various modifications can be made in a combination of the constituent elements or processing processes of the embodiment, and such combinations also fall within the scope of the present invention.

First Modification

In the foregoing, the description has been given with respect to the case where when the service providing request is supplied from the second client apparatus 200 while the service providing unit 106 provides the exclusive service which is not permitted to be simultaneously provided for a plurality of client apparatuses to the first client apparatus 200, the client information presentation section 110 presents the information, associated with the first client apparatus 200, which the client information storage section 116 stores therein to the second client apparatus 200. Instead of this, or by being used together with this, the client information presentation section 110 may present the information associated with the second client apparatus 200 to the first client apparatus 200.

Figure 10:
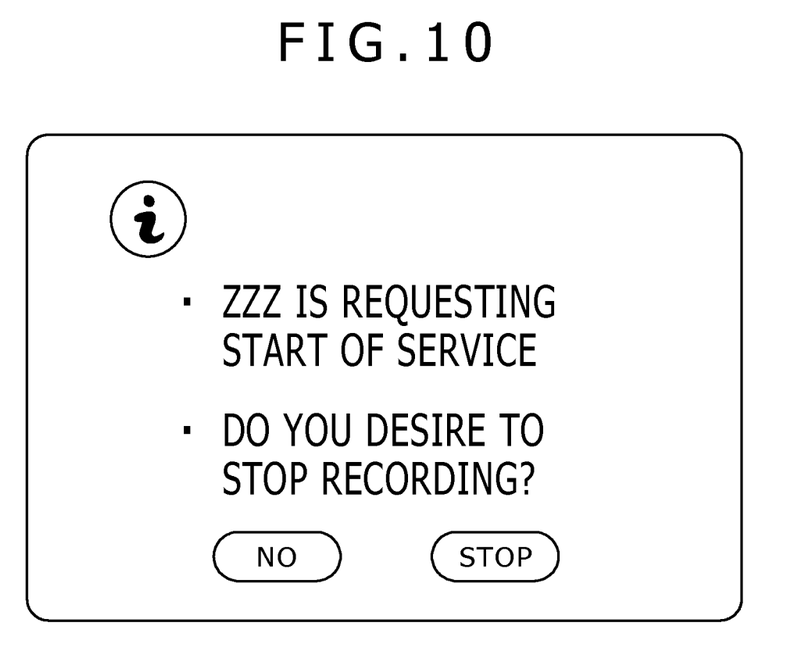
FIG. 10 is a view depicting an example of a picture presented by a client information presentation section according to a first modification of the embodiment.

FIG. 10 is a view depicting a picture presented by the client information presentation section 110 according to the first modification of the embodiment. As shown in FIG. 10, when the service presentation request has been supplied from the second client apparatus 200, the client information presentation section 110 presents the information that the service providing request has been supplied from the second client apparatus 200 to the first client apparatus 200. When the user of the first client apparatus 200 has a will to stop the service, he/she can stop the service by depressing a "stop button" shown in FIG. 10. In such a manner, the user of the first client apparatus 200 who is currently receiving the service from the service providing unit 106 can get the opportunity of independently stopping the service which is being provided. In addition, since it is possible to know that the service presentation request has been supplied from the second client apparatus 200, even when the service is stopped in accordance with the request supplied from the second client apparatus 200, the cause of the service stop is clear. For this reason, it is further possible to lighten the embarrassment of the user of the first client apparatus 200 due to the service stop.

Second Modification

In the foregoing, the description has been given with respect to the case where while the server 100 provides the exclusion service to a certain client apparatus 200, the information associated with the client apparatus 200 which is being provided with the service is provided to a different client apparatus 200. Instead of this, the server 100 may provide the information associated with the client apparatus 200 by taking therein the lead. More specifically, when the server 100 acquires the request to provide a service from a different client apparatus 200 while providing the exclusive service to a certain client apparatus 200, the server 100 may provide the information associated with the client apparatus 200, which is being provided with the service, to the different client apparatus concerned without waiting for the request supplied from the different client apparatus 200 concerned.

Figure 11:
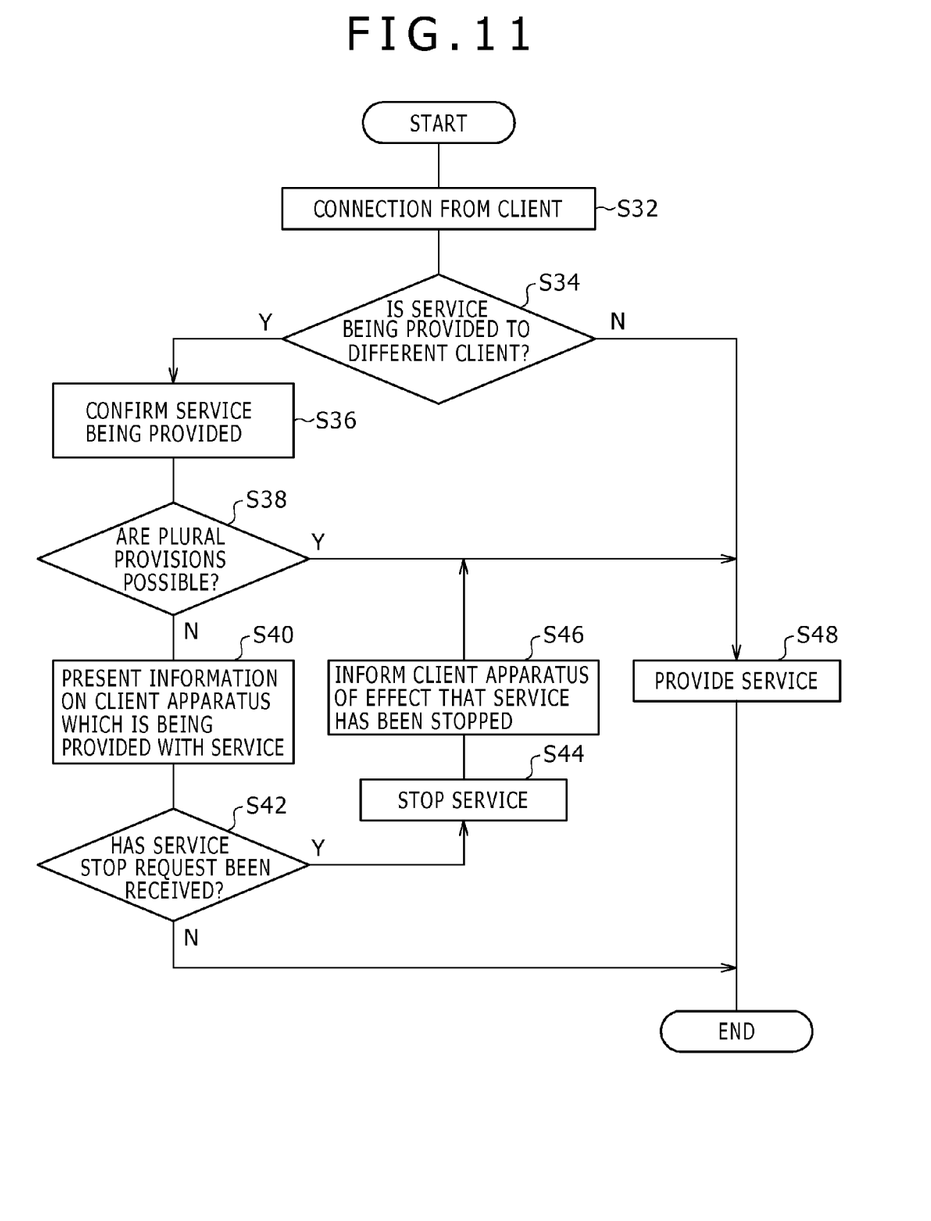
FIG. 11 is a flow chart illustrating a flow of arbitration processing for connection from a plurality of client apparatuses by a server according to a second modification of the embodiment.

FIG. 11 is a flow chart illustrating a flow of the arbitration processing for the connection from a plurality of client apparatuses 200 by the server 100 according to a modification of the embodiment, and is a chart mainly illustrating a flow of the processing in the server 100.

The connection section 112 in the client management unit 108 is connected to one client apparatus 200 (S32). In the case where, when the client apparatus 200 is connected thereto, the service providing unit 106 has already being provided the service to a different client apparatus 200 (Y in S34), the connection section 112 confirms a kind of service which is being provided by making reference to the client information storage section 116 (S36).

When the service which is being provided is exclusive, and thus it is not permitted to simultaneously provide the service for a plurality of client apparatuses 200 (N in S38), the client information presentation section 110 presents the information associated with the client apparatus 200 which is receiving the provision of the service to the client apparatus 200 which is subsequently connected to the connection section 112 (S40).

When the request of the effect that the service which is being provided to the different client apparatus 200 is intended to be stopped has been received as the response from the client apparatus 200 (Y in S42), the arbitration section 114 causes the service providing unit 106 to stop the service which is being provided (S44). The client information presentation section 110 presents the effect that the service has been stopped to the client apparatus 200 which has provided with the service (S46). After that, the service providing unit 106 provides the service to the client apparatus 200 which was subsequently connected to the connection section 112 (S48).

In the case where, when the client apparatus 200 is connected to the connection section 112, the service providing unit 106 has not been providing the service to the different client apparatus 200 (N in S34), or in the case where even when the service providing unit 106 is providing the service to the different client apparatus 200, the service providing unit 106 is permitted to simultaneously provide the service for a plurality of client apparatuses 200 as well (Y in S38), the service providing unit 106 provides the service to the client apparatus 200 which has been connected to the connection section 112 (S22).

Either when the service providing unit 106 starts to provide the service to the client apparatus 200 connected to the connection section 112, or when the request of the effect that the service which is being provided to the different client apparatus 200 is intended to be stopped is not received as the response from the client apparatus 200 (N in S42), the processing in this flow chart is ended.

An arbitration operation of the data distribution system 300 according to a second modification is as follows.

The client apparatus 200 requests the server 100 to provide the service through the network 3. When having acquired the request for the service from the client apparatus 200, in the case where the server 100 is providing the exclusive service to a different client apparatus 200, the server 100 provides the information associated with the client apparatus which is being provided with the service to the different client apparatus. Also, the server 100 stops the service for the client apparatus which is being provided with the service in accordance with the request supplied from the different client apparatus concerned, and starts to provide the service which the different client apparatus concerned requests to provide.

In such a manner, even in the data distribution system 300 according to the modification, it becomes possible to arbitrate the competition for the right of use of the server 100 among a plurality of client apparatuses 200. Since the service which is being provided antecedently can be stopped as may be necessary, it is possible to shorten the time required until the reproduction is started after the data distribution was requested. As a result, the time required until the reproduction is started after the data distribution was requested can be shortened in the server client system.

REFERENCE SIGNS LIST

2 Antenna, 3 Network, 4 Access point, 100 Server, 102 Reception unit, 104 Storage, 106 Service providing unit, 108 Client management unit, 110 Client information presentation section, 112 Connection section, 114 Arbitration section, 116 Client information storage section, 200 Client apparatus, 202 Control unit, 204 Reproduction unit, 206 User interface, 208 Transmission/reception section, 210 Selection informing section, 212 Selection acquisition section, 214 Client information acquisition section, 216 Service requesting section, 300 Data distribution system

INDUSTRIAL APPLICABILITY

The present invention can be utilized for an arbitration technique in a server, a client apparatus, and a data distribution system including the server and the client apparatus.

The invention claimed is:
1. A server comprising:
a processor;
an antenna;
a storage medium;
a connection section connected to one or more client apparatuses through a network;
a service providing unit configured to provide at least one service from among services of live-reception of a digital broadcast using the antenna, distribution of recorded data from the storage medium, and movement of the recorded data from the storage medium to a different apparatus in accordance with a service providing request received from a client apparatus;
a client information storage section configured to store therein information associated with the client apparatus while the connection section is connected to the client apparatus;
a client information presentation section configured to, when a service providing request is supplied from a second client apparatus while a first service which is not permitted to be simultaneously provided for a plurality of client apparatuses is provided to the client apparatus by the service providing unit:
stop the first service to the client apparatus; and
present to the client apparatus an option to relinquish the first service to the second client apparatus,
wherein the first service to the client apparatus is stopped before the option to relinquish the first service is presented to the client apparatus; and
an arbitration section configured provide the first service to the second client apparatus if the client apparatus relinquishes the first service.
2. The server according to claim 1, wherein while the service providing unit is providing the service of either the live-reception of the digital broadcast, or the movement of the recorded data to the different apparatus, the service providing unit does not permit any of other services to be simultaneously provided for a plurality of client apparatuses.
3. The server according to claim 1, wherein the service, for live-reception of the digital broadcast, which the service providing unit provides is at least one of live-viewing of a digital broadcast, and recording of a digital broadcast.
4. The server according to claim 1, wherein the client information storage section stores therein an IP (Internet Protocol) address of the client apparatus which is connected to the connection section, an MAC (Media Access Control) address, a name or an ID (IDentification) of the client apparatus concerned, a name or an ID of a user who utilizes the client apparatus concerned, and information on a service which the client apparatus concerned is utilizing.

5. The server according to claim 1, wherein when the arbitration section stops the service which is being provided to the client apparatus, the client information presentation section presents information associated with the second client apparatus to the client apparatus.

6. An arbitration method for a processor, comprising:
providing at least one service from among services of live-reception of a digital broadcast, distribution of recorded data, and movement of the recorded data to a different apparatus in accordance with a service providing request from a client apparatus;
storing information associated with the client apparatus while connection to the client apparatus is made;
carrying out at least one of that information associated with a first client apparatus is presented to a second client apparatus, and that information associated with the second client apparatus is presented to the first client apparatus, when a service providing request is supplied from the second client apparatus while a service which is not permitted to be simultaneously provided for a plurality of client apparatuses is provided to the first client apparatus; and
stopping a service which is being provided to the first client apparatus, and causing at least one of the first client apparatus and the second client apparatus to select an option presented to the first client apparatus or the second client apparatus as to whether or not the provision of the service which the second client requests to provide is started,
wherein the service to the first client apparatus is stopped before the option is presented to the first client apparatus or the second client apparatus.

7. A non-transitory computer readable storage medium having stored thereon a program for a computer, the program comprising:
providing at least one service from among services of live-reception of a digital broadcast, distribution of recorded data, and movement of the recorded data to a different apparatus in accordance with a service providing request supplied from a client apparatus;
storing therein information associated with the client apparatus while the connection is made to the client apparatus;
realizing at least one of that information associated with a first client apparatus is presented to a second client apparatus, and that information associated with the second client apparatus is presented to the first client apparatus, when a service providing request is supplied from the second client apparatus while a service which is not permitted to be simultaneously provided for a plurality of client apparatuses is provided to the first client apparatus; and
causing the service which is being provided to the first client apparatus to be stopped, and causing at least one of the first client apparatus and the second client apparatus to select an option presented to the first client apparatus or the second client apparatus as to whether or not the provision of the service which the second client requests to provide is started,
wherein the service to the first client apparatus is stopped before the option is presented to the first client apparatus or the second client apparatus.

8. A client apparatus, comprising:
a service requesting section configured to request a server to provide a service, the server providing at least one service from among services of live-reception of a digital broadcast, distribution of recorded data, and movement of the recorded data to a different apparatus through a network;
a client information acquisition section configured to acquire, from the server, information associated with a different client apparatus which is receiving provision of a service from the server when the service requesting section requests the server to provide a service;
a presentation section configured to present the information associated with the different client apparatus acquired by the client information acquisition section;
a selection acquisition section configured to cause the server to stop the service which is being provided to the different client apparatus and configured to acquire selection of an option presented to a user as to whether or not provision of the service which the service requesting section requests to provide is intended to be started,
wherein the service is stopped before the option is presented to the user; and
a selection informing section configured to inform the server of the selection acquired by the selection acquisition section.

9. A service requesting method for a processor, comprising:
requesting a server to provide a service, the server providing at least one service from among services of live-reception of a digital broadcast, distribution of recorded data, and movement of the recorded data to a different client apparatus through a network;
acquiring, from the server, information associated with a different client apparatus which is receiving provision of a service from the server when the server is requested to make a service;
presenting the acquired information associated with the different client apparatus;
causing the server to stop the service which is being provided to the different client apparatus, and acquiring selection of an option presented to a user as to whether or not provision of the service requested is intended to be started,
wherein the service is stopped before the option is presented to the user; and
informing the server of the acquired selection.

10. A non-transitory computer readable storage medium having stored thereon a program for a computer, the program comprising:
requesting a server to provide a service, the server providing at least one service from among services of live-reception of a digital broadcast, distribution of recorded data, and movement of the recorded data to a different client apparatus through a network;
acquiring, from the server, information associated with a different client apparatus which is receiving provision of a service from the server when the server is requested to make a service;
presenting the acquired information associated with the different client apparatus;
causing the server to stop the service which is being provided to the different client apparatus, and acquiring selection of an option presented to a user as to whether or not provision of the service requested is intended to be started,
wherein the service is stopped before the option is presented to the user; and
informing the server of the acquired selection.

11. A data distribution system, comprising:

a server, including a connection section configured to be connectable to one or more client apparatuses through a network, a service providing unit configured to provide at least one service from among services of live-reception of a digital broadcast, distribution of recorded data, and movement of the recorded data to a different apparatus in accordance with a service providing request supplied from the client apparatus which is being connected to the connection section, a client information storage section configured to store therein information associated with the client apparatus while the connection section is connected to the client apparatus, a client information presentation section configured to carry out at least one of that information associated with a first client apparatus and stored in the client information storage section is presented to a second client apparatus, and that information associated with the second client apparatus is presented to the first client apparatus, when a service providing request is supplied from the second client apparatus while a service which is not permitted to be simultaneously provided for a plurality of client apparatuses is provided to the first client apparatus by the service providing unit, and an arbitration section configured to cause the service providing unit to stop the service which is being provided to the first client apparatus, and causing at least one of the first client apparatus and the second client apparatus to select whether or not the provision of the service which the second client requests to provide is started;

two or more client apparatuses, the client apparatus including a service requesting section configured to request a server to provide a service, the server providing at least one service from among services of live-reception of a digital broadcast, distribution of recorded data, and movement of the recorded data to a different apparatus through a network, a client information acquisition section configured to acquire, from the server, information associated with a different client apparatus which is receiving provision of a service from the server when the service requesting section requests the server to provide a service, a presentation section configured to present the information associated with the different client apparatus acquired by the client information acquisition section, a selection acquisition section configured to cause the server to stop the service which is being provided to the different client apparatus and configured to acquire selection of an option presented to a user as to whether or not provision of the service which the service requesting section requests to provide is intended to be started, wherein the service is stopped to the different client apparatus before the option is presented to the user, and a selection informing section configured to inform the server of the selection acquired by the selection acquisition section; and a network through which data communication can be made between the server and the client apparatus, wherein the client apparatus requests the server to provide a service which the sever is caused to provide through the network, and requests the server to provide information associated with a different client apparatus which is different from the client apparatus and is being provided with a service, when the server is providing an exclusive service to the different client apparatus; and the server stops the service for the different client apparatus which is being provided with the service in accordance with a request supplied from the client apparatus which acquired the information associated with the different client apparatus, and starts provision of the service which the client apparatus requests.

* * * * *